United States Patent
Stehle

(10) Patent No.: US 9,602,329 B1
(45) Date of Patent: Mar. 21, 2017

(54) DYNAMIC REMOTE PROCEDURE CALL

(71) Applicant: InstantCal, Inc., Mountain View, CA (US)

(72) Inventor: Carl G. Stehle, Los Altos, CA (US)

(73) Assignee: INSTANTCAL, INC., Mountain View, CA (US)

( * ) Notice: Subject to any disclaimer, the term of this patent is extended or adjusted under 35 U.S.C. 154(b) by 661 days.

(21) Appl. No.: 14/016,024

(22) Filed: Aug. 30, 2013

(51) Int. Cl.
*G06F 15/16* (2006.01)
*H04L 29/06* (2006.01)
*G06F 9/54* (2006.01)

(52) U.S. Cl.
CPC ........ *H04L 29/06047* (2013.01); *G06F 9/547* (2013.01); *H04L 67/40* (2013.01)

(58) Field of Classification Search
CPC ......... H04L 67/02; H04L 67/40; H04L 67/42; G06F 9/546; G06F 9/547; G06F 9/465; G06F 9/548; G06F 15/77
USPC ....................................................... 709/203
See application file for complete search history.

(56) References Cited

U.S. PATENT DOCUMENTS

| | | | | |
|---|---|---|---|---|
| 5,778,228 A * | 7/1998 | Wei | ......................... | G06F 9/547 709/219 |
| 6,708,223 B1 * | 3/2004 | Wang | ...................... | G06F 9/465 719/315 |
| 7,398,533 B1 * | 7/2008 | Slaughter | ................ | H04L 67/16 719/328 |
| 7,533,388 B1 * | 5/2009 | Cavanaugh | ............. | G06F 9/548 709/203 |
| 2003/0070004 A1 * | 4/2003 | Mukundan | ............... | G06F 9/548 719/330 |
| 2003/0191803 A1 * | 10/2003 | Chinnici | .................. | G06F 9/547 709/203 |
| 2003/0204645 A1 * | 10/2003 | Sharma | ..................... | G06F 8/10 719/328 |
| 2004/0054748 A1 * | 3/2004 | Ackaouy | ........... | G06F 17/30067 709/214 |
| 2005/0044197 A1 * | 2/2005 | Lai | ......................... | G06Q 10/10 709/223 |
| 2014/0096148 A1 * | 4/2014 | Yakovenko | ............. | G06F 9/544 719/330 |

* cited by examiner

*Primary Examiner* — Imad Hussain
(74) *Attorney, Agent, or Firm* — Patrick J. S. Inouye

(57) ABSTRACT

Apparatus, methods and systems are disclosed that provide a dynamic remote procedure call (DRPC) capability. DRPC enables a client of a server to dynamically create, modify, and inactivate the services provided by the server while the server is simultaneously executing and providing those services.

33 Claims, 9 Drawing Sheets

DYNAMIC REMOTE PROCEDURE CALL

BACKGROUND

Technical Field

The disclosed technology relates to the field of Remote Procedure Call (RPC) technology used by computer procedures that are executed by one or more computers.

Background Art

Traditional RPC technology enables one program (the RPC client) to invoke a procedure that is executed by a server program (the RPC server) to provide a service. The RPC client and RPC server often, but need not, execute on different computers connected by a network (for example, the Internet).

At a high level of abstraction and within a standard Object Oriented Programming (OOP) framework, traditional RPC operates by executing methods provided by one or more global objects at the RPC server. When executed, the methods in these global objects provide services for the RPC client. One goal of traditional RPC is to allow a procedure executing on the same computer as the RPC client to invoke object methods to perform services without the procedure being aware of whether the service is provided through local execution of the method providing the service, or whether the service is performed through remote execution of the method providing the service. Thus, the Application Programming Interface (API) for the service is independent of whether the service is executed locally or remotely.

The RPC client program can use one or more stub objects that have a one-to-one relationship with the services provided by the RPC server. Both the RPC server and RPC client often include ancillary procedures that are used by the RPC server and RPC client to provide necessary communication and coordination facilities.

When the RPC client program invokes a method of a stub object, the stub object assembles the parameters passed to the method into a message and identifies the corresponding object on the RPC server. An interface description language (IDL) can be used to assemble the message (for example into XML, JSON, etc.). The message is sent to a server stub that extracts the message (thus, generating parameters that are to be passed to the specified method of the identified object on the RPC server). The RPC server executes the method and returns a result (in a similar manner) to the RPC client stub that, in turn, can return the result to the RPC client program in accordance with the API for the executed method.

Traditional RPC can also be implemented using a prototypal language (such as JavaScript). Traditional RPC including callbacks and their use.

In prior traditional RPC, there is a static association between the RPC client request and an operation on the RPC server as well as with the callback on the RPC client invoked by the RPC server. RPC communication can be programmed as a synchronous operation (the RPC client program requests a service from the RPC server and waits until that requested service completes) or as an asynchronous operation (where the RPC client program requests a service from the RPC server and then continues processing). The RPC server can invoke the callback on the RPC client at later time.

Previous object-based traditional RPC protocols use static functions normally identified by name. The RPC client cannot easily modify functions provided by the RPC server while the RPC client and the RPC server are communicating. Furthermore, the RPC client cannot directly use object instances at the RPC server. Finally, the RPC client cannot submit programming language statements (client-specified statements) to the RPC server for execution on the RPC server. Some RPC server JavaScript implementations can replace functions (for example, by downloading and using script tags etc.). However, in these implementations, the replaced functions are still static functions identified by name; and the RPC server is inactive while the functions are being replaced.

It would be advantageous to have an RPC client that can define new services or modify existing services provided by an RPC server dynamically such that those new/modified services can be immediately accessed in real-time. It would also be advantageous for the RPC client (or RPC server) to construct and use object instances on the RPC server. It would also be advantageous to expand the callback functionality beyond that provided by traditional RPC. In addition, it would be advantageous for an RPC client to direct a RPC server to execute client-specified statements.

SUMMARY

One aspect of the disclosed technology is a computer-implemented method for providing a dynamic remote procedure call capability between a client and a server. The server includes a run-time self-modification capability. The client and the server establish a session between them. The client sends to the server a modification request that includes both a property definition and a service entity identification of a service entity resident on the server. The server receives the modification request and resolves the service entity in accordance with the service entity identification. Once the service entity is resolved, the server modifies the service entity in accordance with the property definition resulting in a modified service entity and thus satisfy the dynamic remote procedure call capability.

Another aspect of the disclosed technology is a computer-implemented method for providing a dynamic remote procedure call capability on a server. The server includes a run-time self-modification capability. The method establishes a session and receives a modification request. The modification request includes both a property definition and a service entity identification of a service entity on the server. The method resolves the service entity in accordance with the service entity identification and modifies the service entity in accordance with the property definition wherein the service entity as modified is a modified service entity and thus satisfy the dynamic remote procedure call capability.

Yet another aspect of the technology is a computer-implemented apparatus. The apparatus includes a server session module that is configured to establish a session and a server communication module. The server communication module is configured to receive a plurality of requests that include a modification request. The modification request includes both a property definition and a service entity identification of a service entity. The service entity identification is responsive to the server session module. The apparatus also includes a server resolve module configured to resolve the service entity in accordance with the service entity identification. In addition, a server morph module, that is responsive to the server resolve module, is configured to modify the service entity in accordance with the property definition. The service entity as modified is a modified service entity. The apparatus includes a central processing unit (CPU) and a memory coupled to the CPU configured and is configured as a server with a run-time self-modification capability and so provides a dynamic remote procedure call capability.

The foregoing and many other aspects of the present technology will no doubt become obvious to those of ordinary skill in the art after having read the following detailed description of the preferred embodiments that are illustrated in the various drawing figures.

DETAILED DESCRIPTION

Notations and Nomenclature

Figure 1:
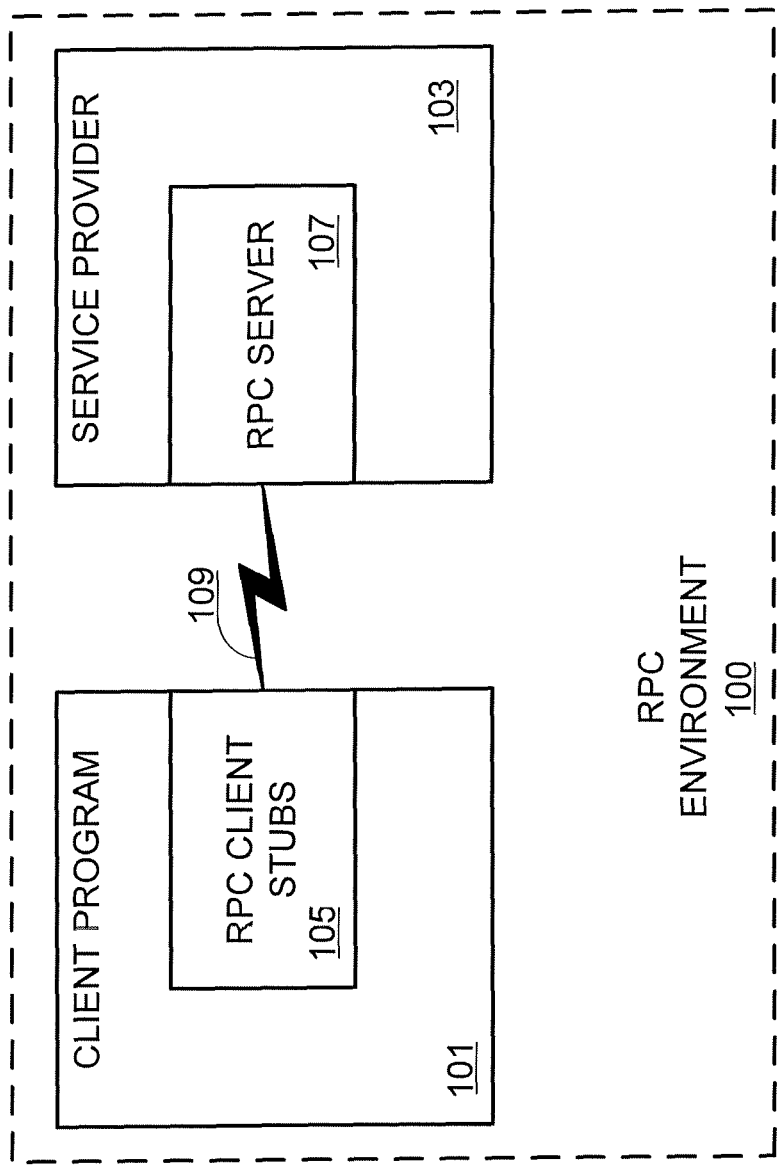
FIG. 1 illustrates a prior art RPC environment.

The following "notations and nomenclature" are provided to assist in the understanding of the presented technology and the embodiments thereof One skilled in the art will understand that although the following description of the technology is cast within a prototypal programming paradigm, the techniques disclosed can be applicable to other programming paradigms that have run-time self-modification capability.

API—is an Application Programming Interface.

Catalog—is any technique for maintaining information that maps a DRPC server instance identification to a DRPC instance on the DRPC server. A catalog can be a database, collection, map, array, etc. In one embodiment of the disclosed technology, the catalog includes containers for each DRPC session; each session container holds information for each DRPC client identifier, which includes references (server instance identifications) to DRPC instances available to that DRPC client identifier, as well as other DRPC management information.

DRPC callbacks—DRPC supports traditional RPC callbacks and adds support for callback collections and reoccurring callbacks. Traditional RPC synchronous and asynchronous callback technology will not be described herein. Reoccurring callbacks are those that can be specified once, but invoked multiple times. Callback collections are those where multiple independent callbacks are specified. Callbacks in a callback collection can be independently invoked. Callback collections can include a mixture of non-reoccurring and reoccurring callbacks.

Client callback—as used in a DRPC context, is a procedure that the DRPC client will execute responsive to the occurrence of a condition detected by the DRPC server.

Server callback—as used in a DRPC context, is a procedure that the DRPC server executes responsive to a condition detected within the DRPC server. A server callback is invoked responsive to a callback trigger. Many server callbacks are DRPC server functions that have wrapped one or more client callbacks with a server callback context (for example, in JavaScript the wrapper could be a closure), and can be invoked from any context within the DRPC server. When the server callback is executed, the server callback can perform various operations, such as cataloging implicit DRPC instances, and communicating with the DRPC client to initiate the corresponding client callback.

Callback trigger—is a condition or computation which results in the invocation of a server callback. A callback trigger can occur on the DRPC server either directly within a procedure defining the trigger, or indirectly, possibly at a later time, within a procedure responsive to the procedure defining the trigger (for example, within a system timer or event handler).

Call chain—a sequence of one or more tokens (or token equivalents). Example call chains include those shown in Table 1. A call chain can include references to properties (including mutable instance constructors and methods, which are themselves properties), invocations of properties (method calls), and construction of DRPC instances, etc. Implementations of DRPC may or may not support argument passing to method calls. Implementations that support argument passing may or may not support passing callbacks as arguments. A call chain can be parsed to extract the tokens contained therein.

TABLE 1 a
a( )
a.b
a( ).b
a.b( )
a.b.c.d.e
a( ).b( ).c( ).d( ).e( )
new a( ).b
a.b(new c( )).d Calling context—is a scope. In JavaScript, for example but without limitation, a calling context can be the global context or the context within any object. A context can be encapsulated using a "closure." Other prototypal languages provide substantially the same capability.

Server callback context—is the context within which a server callback executes. The server callback context's scope contains DRPC session information.

Call token—is the name of a method property followed by "()". Thus, "foo( )" is a call token and "foo.a" is not. A call token is used to invoke a method (the term "invoke" is equivalent to cause execution of the method).

Client-specified statement—is a programming language statement (or equivalent) created by the DRPC client for execution by the DRPC server. In one embodiment the programming language statement can be a JavaScript statement capable of being executed by the JavaScript eval( ) function.

Computing device—can be anything that includes a network API and a computational processor such as a smart phone, computer, tablet, kitchen appliance, etc.

Construct—means the invocation of a mutable instance constructor that constructs a DRPC instance and can include the association of a server instance identification to identify the DRPC instance so constructed. A DRPC instance can be an explicit DRPC instance or an implicit DRPC instance. In JavaScript, a mutable instance constructor is invoked by applying the "new" JavaScript operator to a mutable instance constructor function call.

DRPC connection—is a communication mechanism that enables a DRPC client to communicate with a DRPC server or a DRPC server with a DRPC client. For example, a WebSocket can be used if the DRPC server is on a network that is directly useable by the DRPC client. In addition, if the DRPC server is on a network not directly useable by the DRPC client, HTTP can be used together with a host proxy to establish the DRPC connection. Other methods also can be used (for example, UDP tunneling without a host proxy). Furthermore, DRPC uses the communication mechanism via an API so that, in some configurations, the DRPC server and the DRPC client can communicate without invoking the physical layer of a communications protocol stack.

Explicit DRPC instance—is a DRPC instance constructed by the DRPC server responsive to a request and given a server instance identification specified by the DRPC client.

Implicit DRPC instance—is a DRPC instance that was constructed and given a server instance identification chosen by the DRPC server during the fulfillment of a DRPC client request.

Server instance identification—is an identification of a DRPC instance. The server instance identification can be chosen and assigned to a DRPC instance by the DRPC server. The server instance identification can be communicated to the DRPC client for use by the DRPC client to specify a DRPC instance when making a request related to that DRPC instance (including its constructor).

DRPC protocol—this protocol conveys requests from the DRPC client to the DRPC server, and responses from the DRPC server to the DRPC client.

DRPC service entity—includes both mutable instance constructors and DRPC instances constructed by execution of one or more mutable instance constructors.

DRPC service entity identification—is an identification of a DRPC service entity. A DRPC service entity can be identified by name or by a server instance identification.

DRPC session—is an association between a DRPC client and one or more DRPC servers. This association is established over one or more DRPC connection(s) (if using a duplex communication channel) or set of DRPC connections (if using half-duplex communication channels) for ongoing communication between one or more DRPC clients or one or more DRPC servers. DRPC sessions can use a single DRPC connection between a computer hosting multiple DRPC clients and the computer hosting the DRPC server providing services to those clients. In one embodiment, the DRPC server maintains the DRPC sessions.

Ephemeral statement—a client-specified statement provided by the DRPC client that the DRPC server executes once. The ephemeral statement can, in JavaScript for example, include a combination of multiple JavaScript language statements that can be executed by the "eval( )" JavaScript function.

Inactivate—a process of inactivating a DRPC service entity such as by directly or indirectly deleting the DRPC service entity, removing references to the DRPC service entity, making it available for garbage collection, etc. Inactivation can also include removing a DRPC service entity identification from the catalog. Child DRPC instances can be inactivated when a parent DRPC instance is inactivated.

Mutable instance constructor—is an object that is identifiable, mutable, and can be used to construct an instance including a DRPC instance.

Procedure—is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing on one or more computers, or a sequence of steps performed by electronic or other circuitry, or any logic or combination of the foregoing. Thus, a procedure can include a programmed function, programmed method, programmed subroutine, object method, class method, or any other program or portion of program that can be invoked to return a value, perform an operation, execute a callback, etc. A procedure can include a set of procedures (for example, a library, API, etc.).

Property—is a data container, a procedure, a method, a function, a prototype, etc. (for example without limitation, a JavaScript function) contained within a DRPC service entity.

Request—is a DRPC request such as a modification request, an ephemeral request, an execution request, etc. A request can include client callback information.

Resolve—means a call chain has been traversed and the calling context of the last token has been determined. In some embodiments the last token need not be the actual last token in the call chain, but can be the last token processed in the call chain.

Run-time self-modification capability—The disclosed technology requires that DRPC's execution environment be capable of, at run-time, modifying a procedure (sometimes referred to as "on-the-fly code generation"). JavaScript and other prototypal languages provide this capability. This capability can also be present in object-oriented languages that enable reflection and late binding.

Token—is a datum or symbol. Tokens can identify global objects, properties, or DRPC service entities and in one embodiment, tokens are represented by strings. In addition, tokens include the "new" reserved word (a new token). Token equivalents can be data-structures that carry the meaning of a string token.

DETAILED DESCRIPTION

Dynamic RPC (DRPC) is one aspect of the disclosed technology. Dynamic RPC enables DRPC service entity definition, modification, inactivation, and construction; while the DRPC client and the DRPC server are both active and communicating. Thus, the DRPC server can run continuously without the need to be stopped and reloaded to affect a modification with a corresponding increase in the availability of the DRPC server. Further, these dynamic capabilities enable DRPC to be compatible with existing software libraries, legacy procedures, etc. that need callers to define certain functions, including functions that are defined within certain instances.

Dynamic RPC enables the DRPC client to pass a single callback or a callback collection from which the DRPC server can: 1) the DRPC server select one callback from the callback collection responsive to a condition on the DRPC server; 2) select multiple callbacks from the callback collection responsive to one or more conditions on the DRPC server; 3) specify a single callback that is similar to a traditional callback in traditional RPC implementations; or 4) perform any combination of steps 1), 2) and 3). In addition, the DRPC client can specify that one or more of the callbacks is a reoccurring callback regardless of whether the reoccurring callback is specified as a single callback or is specified within a callback collection. One benefit of a callback collection is that the DRPC server can return different kinds of information as well as different amounts of information to the DRPC client responsive to a single request from the DRPC client.

Another aspect of Dynamic RPC is that the DRPC client can request that the DRPC server execute ephemeral statements. This capability makes the DRPC server extremely flexible in that the DRPC server software can be dynamically updated or debugged.

Another aspect of Dynamic RPC is that a large number of DRPC sessions may exist between one or more DRPC clients and a DRPC server. Thus, multiple applications can share the DRPC server. In addition, a DRPC client can access multiple DRPC servers. This provides redundancy, and improves performance and reliability.

Another aspect of Dynamic RPC is that a large number of DRPC clients executing on the same client computing platform can share a DRPC connection. For example, if two applications on a computing platform are each using the same or different DRPC server(s) on a single server computing platform, only a single DRPC connection need be established between the server platform and the client platform. This aspect simplifies connection management and eliminates connection setup time and resource use for all but the one connection.

Another aspect of Dynamic RPC is that the DRPC server can make a substantially large number of callbacks (including reoccurring callbacks, callbacks within a callback collection, etc.) to the DRPC client responsive to a single DRPC client request. Thus, the DRPC server can send aperiodic or periodic information to the DRPC client without explicit polling by the DRPC client.

Yet another aspect of Dynamic RPC is enabling a computing device to act as a DRPC client, a DRPC server, or both. Thus, two computing devices (similar or dissimilar) can establish a DRPC connection and can maintain a first DRPC session for the client/server (a client on a first computing device and a server on a second computing device) and a second DRPC session for the server/client (a server on the first computing device and a client on the second computing device) over the DRPC connection. In addition, multiple device applications on the first computing device can maintain separate client/server or server/client DRPC sessions with one or more device application(s) on the second computing device.

FIG. 1 illustrates a prior art RPC environment 100 used with traditional RPC implementations. The prior art RPC environment 100 includes a client program 101, which can be a procedure that uses prior art remote procedure calls to invoke services provided by a service provider 103. The service provider 103 is the computing environment that executes the remote services that are available to the client program 101. The computing environment includes a central processing unit (CPU) and memory coupled to the CPU. The client program 101 invokes a desired service by invoking a particular client stub from an RPC client stubs module 105. The RPC client stubs module 105 communicates to an RPC server module 107 using a communications channel 109. The RPC server module 107 performs the service associated with that particular client stub and can return a result over the communications channel 109 back to the RPC client stubs module 105 that then provides the result to the client program 101. The prior art RPC environment 100 can have multiples of the RPC client stubs module 105 using the RPC server module 107.

The client program 101 is generally unaware of how the requested service is provided. That is, the client program 101 is unaware of whether procedures are invoked that locally execute to provide the service, or whether a stub procedure is invoked that, in turn, invokes remote execution of a procedure executing on the service provider 103 to provide the service. The services provided by the RPC server module 107 are not changed while the RPC server module 107 is actively providing those services.

Both the RPC client stubs module 105 and the RPC server module 107 contain procedures to communicate via the communications channel 109. In addition, the terms "local" and "remote" in the client-server context indicate that "local" and "remote" are merely separated by an API (for example, without limitation a communications API) and the use of these terms does not necessarily imply the use of a physical communication device, different computers, etc.

Figure 2:
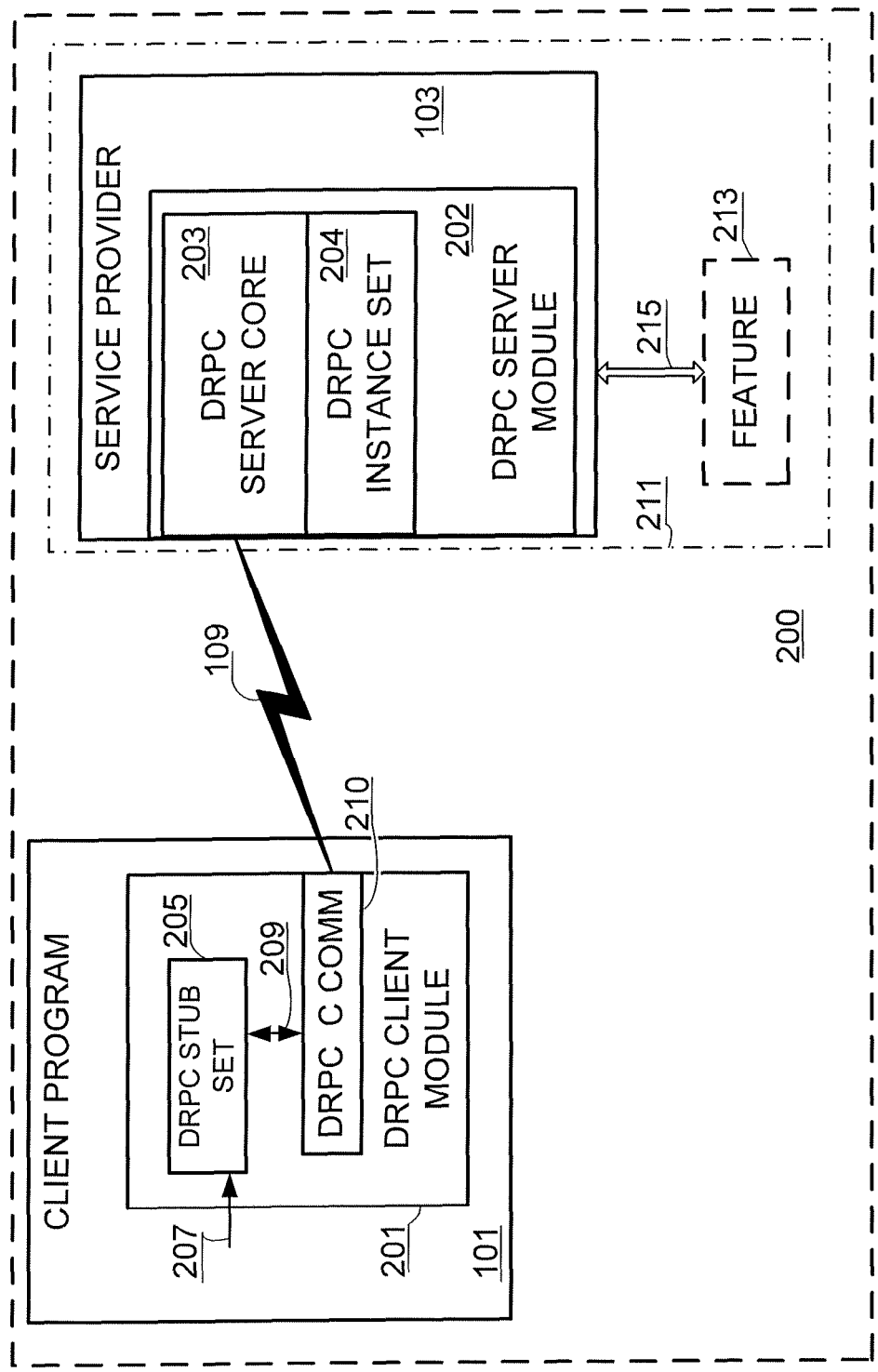
FIG. 2 illustrates a dynamic RPC (DRPC) environment.

FIG. 2 illustrates a dynamic RPC environment 200 to provide a conceptual overview of the disclosed technology. As in the prior art RPC environment 100, the client program 101, can be a procedure that invokes services provided by the service provider 103.

The client program 101 now uses a DRPC client module 201 instead of the traditional RPC client stubs module 105. The DRPC client module 201 communicates requests to a DRPC server module 202 via the communications channel 109. The DRPC server module 202 includes a DRPC server core module 203 that includes at least one global object (that provides, for example, one or more methods and associated properties). This global object can include procedures to dynamically construct and access explicit and implicit DRPC instances as indicated by a DRPC instance set 204.

To help illustrate the conceptual difference between traditional RPC and DRPC, referring to FIG. 2, the DRPC server core module 203 and the DRPC instance set 204 are drawn as separated. This separation need not imply a separation in memory, modules, or other separation. This separation indicates that the client program 101 through the DRPC client module 201 can request that DRPC service entities be dynamically constructed by the DRPC server core module 203 and that the client program 101 can subsequently invoke those dynamically constructed DRPC service entities. The subsequent description with reference to FIG. 3 further details the architecture of the DRPC server module 202.

The DRPC server core module 203 provides services used to support DRPC. These services can include, but are not limited to, communication channel management, session management, server callback management, DRPC client request management, etc. An architecture for the DRPC server core module 203 is discussed with reference to FIG. 3.

The DRPC client module 201 includes a DRPC client stub set 205. The client program 101 can invoke services from the DRPC client stub set 205 using a stub API 207. The DRPC client stub set 205 communicates, using an API 209, with a DRPC client communication module 210. The DRPC client communication module 210 provides functionality for communicating across the communications channel 109 to and from the DRPC server module 202 by, for example, establishing a DRPC connection and a DRPC session as well as sending and receiving information, etc.

Traditional RPC implementations can establish a single session between the RPC client stubs module 105 and the RPC server module 107. One DRPC advantage is that the DRPC client communication module 210 can include the capability of establishing multiple DRPC sessions per the DRPC client stub set 205 using the same or different DRPC connections. The DRPC server should implement traditional multiprogramming safeguards to prevent collisions between the DRPC clients if multiple DRPC sessions are used.

There are many possible ways to integrate the functionality provided by the DRPC client stub set 205, the API 209, and the DRPC client communication module 210 including, for example, combining the functionality of these modules into a single procedure, into separate procedures that differ from the organization disclosed herein, etc.

Some embodiments of the disclosed technology implement the DRPC server core module 203 and the DRPC instance set 204 on a computing device 211 that can include an optional feature 213. The optional feature 213 can be, for example but without limitation, a sensor, a peripheral, a procedure, a communication channel etc. The service provider 103 can access the optional feature 213 using an "optional feature access" mechanism 215. The "optional feature access" mechanism 215 can include system or API calls, network protocols, as well as capabilities available to the computing device 211 such as device functions or computational services.

While traditional RPC can be used with newer HTML5 web applications and HTML5 hybrid applications, traditional RPC is inflexible. Thus, applications such as an Integrated Development Environment (IDE) to support development of an optional feature 213 on the computing device 211 go to great extent to emulate or simulate the computing device 211 because the tools to actually debug the optional feature 213 while executing on the computing device 211 are rudimentary or non-existent. DRPC enables an IDE to be able to develop and debug using an actual real computing device 211 instead of a simulated or emulated version of the computing device 211. Further, DRPC allows use of software libraries that can only execute on a real computing device 211 and not on a simulated environment.

Figure 3:
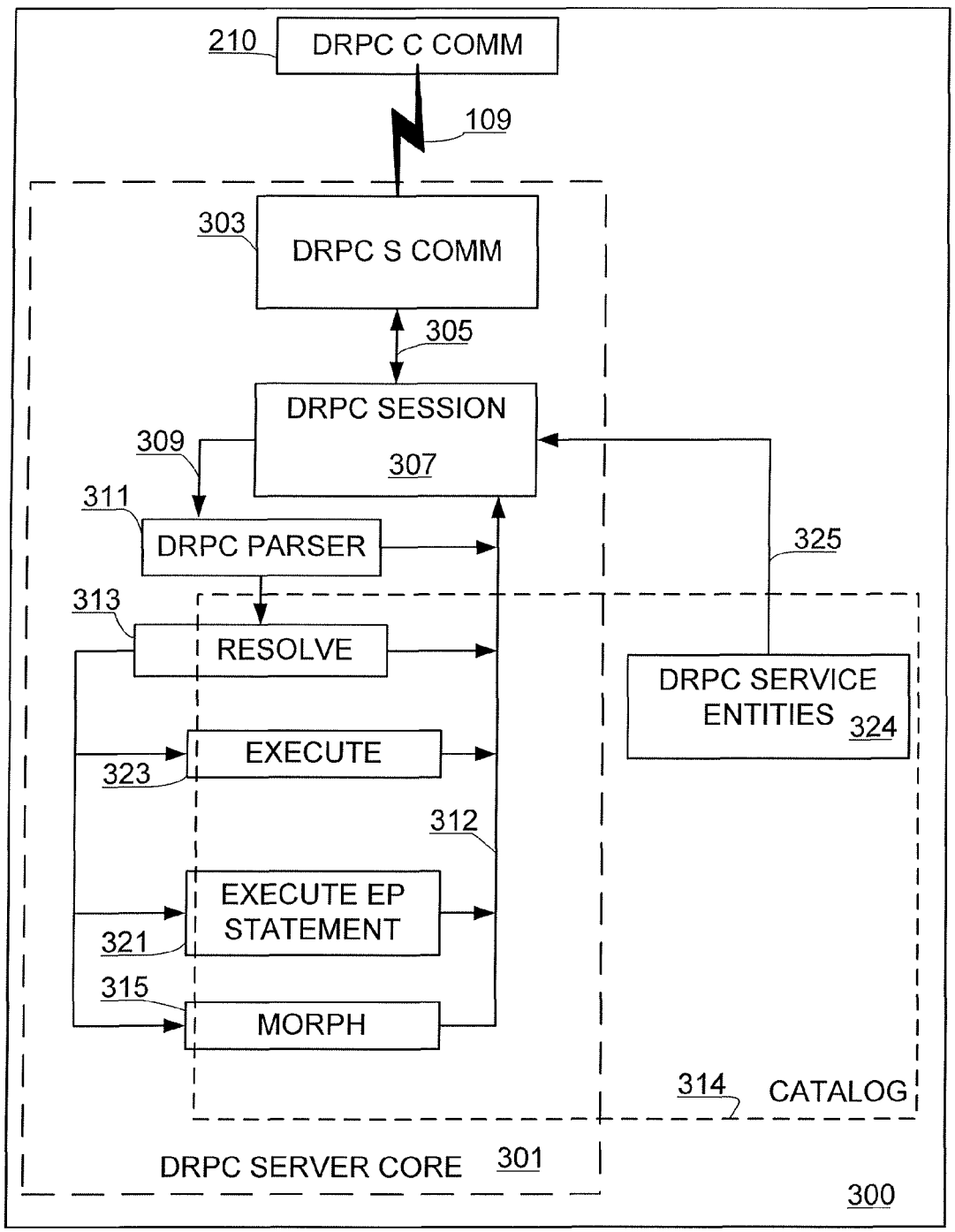
FIG. 3 illustrates a DRPC server architecture in accordance with one embodiment.

FIG. 3 illustrates a DRPC server architecture 300 for the DRPC server module 202 conceptualized in FIG. 2. The DRPC server architecture 300 includes a DRPC server core module 301 that implements the dynamic capabilities of a DRPC server. The DRPC server core module 301 can include a "DRPC server communication" module 303 that enables at least one DRPC client communication module 210 to establish one or more DRPC connections with the DRPC server core module 301 over the communications channel 109. Once the DRPC connection(s) is established, the "DRPC server communication" module 303 uses a session API 305 to interact with a DRPC session module 307 that manages DRPC session(s) over the DRPC connection(s). In one embodiment, a DRPC session is assigned to each DRPC client. Thus in this embodiment, multiple DRPC clients executing on a single computer can share the DRPC connection to the DRPC server, while each DRPC client has its own DRPC session.

Requests sent by the DRPC client communication module 210 can be decoded by the DRPC session module 307. The decoded requests can be sent via a parser API 309 to a DRPC parser module 311. If the request is defective, the DRPC parser module 311 can provide an error status back to the DRPC session module 307 via a status callback API 312. The DRPC session module 307 receives the error status and can cause a client callback to be executed to handle the defective request. Success and error callbacks from the DRPC server core module 301 can use conventional techniques to invoke traditional client callbacks.

In one embodiment, the requests can include a modification request, an execution request, and an ephemeral request. The execution request and ephemeral request can contain DRPC callback information that can be used to invoke DRPC client callbacks responsive to conditions detected by the DRPC server module 202. DRPC callbacks are subsequently discussed with reference to FIG. 7, FIG. 8, and FIG. 9.

If the DRPC parser module 311 successfully parses the request, the request is passed to a resolve module 313 to establish a calling context and token for the request as is subsequently described with reference to FIG. 4. The resolve module 313 can pass error status to the DRPC session module 307 via the status callback API 312. The resolve module 313 can access a catalog 314. If the call chain is single token, the resolve module 313 can pass that token and the calling context directly to a morph module 315, an "execute ephemeral statement" module 321, or an execute module 323. If the call chain includes multiple tokens, the resolve module 313 can traverse intermediate tokens updating the calling context to that of the last token.

If the request is a modification request (which includes an inactivation request) the resolve module 313 dispatches to the morph module 315 to process the request as is subsequently described with reference to FIG. 5. Result status (for example, success/error) of the request can be returned to the DRPC session module 307 via a status callback API 312 for communication back to the DRPC client communication module 210 to subsequently invoke any pending client status callbacks.

When a DRPC service entity identification is added to the catalog 314, the DRPC service entity identification can be returned to the DRPC client communication module 210 via the DRPC session module 307 for use by the DRPC client stub set 205 for subsequent identification of the DRPC service entities.

If the request was an ephemeral request, the resolve module 313 dispatches to the "execute ephemeral statement" module 321 that binds any DRPC client callback arguments and executes the provided ephemeral statement as is subsequently described with reference to FIG. 8. Execution status of the ephemeral request can be returned to the DRPC session module 307 via the status callback API 312 for communication back to the DRPC client communication module 210 to subsequently invoke any pending client status callbacks.

If the request was an execution request, the resolve module 313 dispatches to the execute module 323 that binds any DRPC client callback, and invokes the property (a method) corresponding to the token selected by the resolve module 313 on the calling context also selected by the resolve module 313. Execution status of the execution request can be returned to the DRPC session module 307 via the status callback API 312 for communication back to the DRPC client communication module 210 to subsequently invoke any pending client status callbacks. The execute module 323 is subsequently described with reference to FIG. 7.

The "execute ephemeral statement" module 321 and the execute module 323 are server execution modules.

The catalog 314 catalogs a server instance identification for an explicit or implicit DRPC instance (both represented by a DRPC service entity set 324).

The DRPC instances in the DRPC service entity set 324 can include server callbacks or references to server callbacks. When a server callback from the DRPC service entity set 324 is invoked, the server callback uses a DRPC server callback API 325 to the DRPC session module 307 to communicate the callback information back to the DRPC client module 201.

In one embodiment of the disclosed technology, the execution request (processed as subsequently described primarily with reference to FIG. 4 and FIG. 7) includes: 1) a DRPC session, 2) a DRPC client-generated unique identification of the client within a DRPC session (a client identifier), 3) an DRPC service entity identification used to locate a DRPC service entity for the request, 4) the request type (that is, the execution request), and 5) arguments needed for the execution request. These arguments can include DRPC client-specified names for object properties and DRPC client callbacks. Object properties are used to locate and identify (resolve) specific data or methods that are contained within an object hierarchy as is subsequently described with reference to FIG. 4. The DRPC client callbacks can be invoked within fulfillment of the execution request as is subsequently described with reference to FIG. 9.

In one embodiment of the disclosed technology, the modification request (which is processed as subsequently described primarily with reference to FIG. 4 and FIG. 5) includes substantially similar parameters to parameters 1-5 above as well as 6) an instance flag to specify whether the request applies to a mutable instance constructor or a DRPC instance.

In one embodiment of the disclosed technology, the ephemeral request (processed as subsequently described primarily with reference to FIG. 4 and FIG. 8), includes: 1) a DRPC session, 2) a DRPC client-generated unique identifier of the client within a DRPC session (a client identifier); 3) an ephemeral statement to be executed; 4) the request type; and 5) arguments needed for the ephemeral request. The ephemeral statement can use the status callback API 312 to return status information regarding the execution of the ephemeral statement to the DRPC client. These arguments can include DRPC client callbacks.

Depending on the language used to implement DRPC, the modules that comprise the DRPC server core module 301 can be completely or partially implemented as global objects (for example but without limitation, JavaScript global objects).

To help the reader focus on the more instructive aspects of the disclosed technology, the details of error processing (for example, the techniques used to send success/error callback via the status callback API 312) are not explicitly included.

Figure 4:
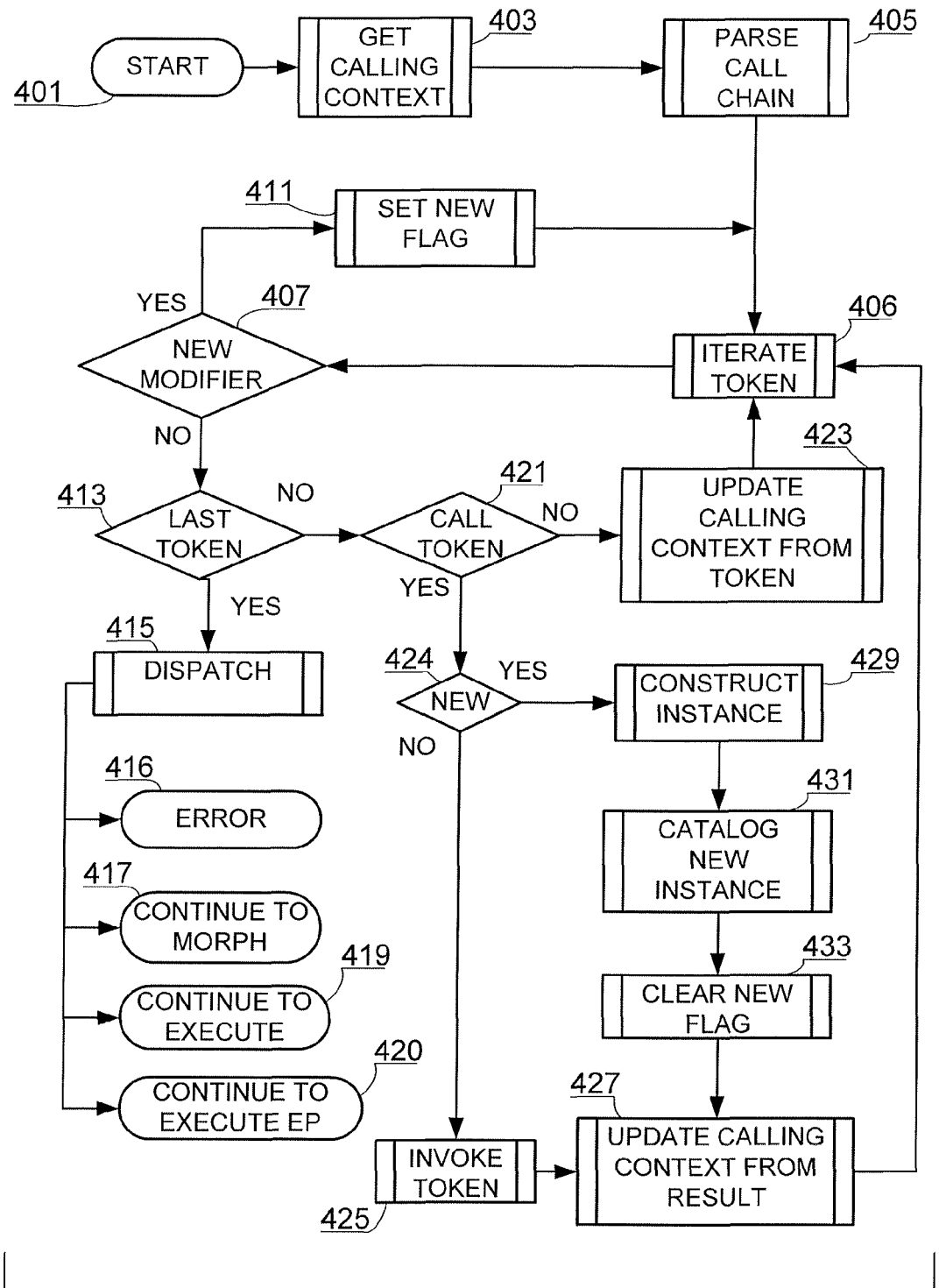
FIG. 4 illustrates a resolve procedure in accordance with one embodiment.

FIG. 4 illustrates a resolve procedure 400 that details one implementation of the resolve module 313 of FIG. 3. The resolve procedure 400 resolves the calling context of the last token in the call chain (for example, propagating changes in the calling context as the call chain is traversed). The calling context is initially set to the context of an object referred to by name (for example, the context of a "window object" in a browser), or to the context of an explicit/implicit DRPC instance (for example, an object identified by a server instance identification). In JavaScript, the context of an object referred to by name can be determined by evaluating the name.

The resolve procedure 400 determines whether the call chain contains a "new" reserved word (if so, a new explicit DRPC instance is to be constructed); whether the token represents a reference to a property of a DRPC service entity (for example, "inst.prop") or is an invocation of a property of the DRPC service entity (for example, "inst.func( )"); whether the request will invoke the morph module 315 and if so, whether the request is to operate on a mutable instance constructor or is to operate on a DRPC instance. Furthermore, the resolve procedure 400 traverses the call chain to determine the calling context for each token in the call chain and so determine a calling context for the last token in the call chain. If the request operates on a mutable instance constructor, the operation applies to all DRPC instances previously constructed by, or that will be constructed by the modified mutable instance constructor.

The DRPC parser module 311 described with reference to FIG. 3 invokes the resolve procedure 400 that initiates at a start terminal 401 and continues to a get calling context procedure 403. The get calling context procedure 403 determines the initial calling context within which the request is to be processed.

The calling context is initially set to the context of an object referred to by name or to the context of an explicit or implicit DRPC instance. Once set, the resolve procedure 400 continues to a "parse call chain" procedure 405 that parses the call chain into an ordered set of tokens. Once the call chain is parsed, the resolve procedure 400 continues to an iterate token procedure 406. For each token in the ordered set of tokens, the iterate token procedure 406 passes that token to a new modifier decision procedure 407 that determines whether the token is the "new" reserved word and if so, the resolve procedure 400 continues to a set new flag procedure 411 that remembers that a "new" reserved word was encountered and the resolve procedure 400 continues to the iterate token procedure 406 to iterate the next token.

If the new modifier decision procedure 407 determines that the token is not the "new" reserved word, the resolve procedure 400 continues to a last token decision procedure 413 that determines whether the passed token is the last (or only) token in the ordered set of tokens. If the passed token is the last (or only) token, the resolve procedure 400 continues to a dispatch procedure 415 that selects which module is to receive that token and its calling context and so process the request. In one embodiment, neither the morph module 315 nor the "execute ephemeral statement" module 321 will process a set "new" flag on entry to those modules. Thus, if the dispatch procedure 415 detects such a condition it can continue to an error terminal 416 to post an error status via the status callback API 312. Alternatively, the morph module 315 and the "execute ephemeral statement" module 321 can detect the condition and invoke the status callback API 312 accordingly.

To process the request, the DRPC server architecture 300 continues to the morph module 315 via an "invoke morph" terminal 417, the execute module 323 via an "invoke execute" terminal 419, or the "execute ephemeral statement" module 321 via an "invoke execute ephemeral" terminal 420 accordingly.

The calling context provided via the "invoke execute ephemeral" terminal 420 or the "invoke execute" terminal 419 (for a single token call chain) is the initial calling context.

If the last token decision procedure 413 determines that the iterated token is not the last token, the resolve procedure 400 continues to a call token decision procedure 421 that determines whether the token is a call token. If the token is not a call token, the resolve procedure 400 continues to an "update calling context from token" procedure 423 that updates the calling context within which that token is to execute in the call chain. Once the calling context is updated, the resolve procedure 400 returns to the iterate token procedure 406 to iterate the next token from the ordered set of tokens.

If the call token decision procedure 421 determines that the iterated token is a call token, the resolve procedure 400 continues to a new decision procedure 424 that determines whether the "new" reserved word preceded the call token. If the call token has not been preceded by the "new" reserved word, the resolve procedure 400 continues to an invoke token procedure 425 that invokes the call token. Once the call token has been invoked, the resolve procedure 400 continues to an "update calling context from result" procedure 427 that evaluates the result of the invocation of the call token and updates the calling context accordingly. Next the resolve procedure 400 continues to the iterate token procedure 406 to iterate the next token from the ordered set of tokens.

If the new decision procedure 424 determined that the call token has been preceded by the "new" reserved word (responsive to the state of the flag set by the set new flag procedure 411), the resolve procedure 400 continues to a "construct DRPC instance" procedure 429 that constructs a new DRPC instance in accordance with the iterated token (for example, in JavaScript construction of the new DRPC instance results from the application of JavaScript's "new" operator on a mutable instance constructor). Once the DRPC instance is constructed, the resolve procedure 400 continues to a "catalog new DRPC instance" procedure 431 that chooses and assigns a server instance identification to the newly constructed DRPC instance and adds the server instance identification to the catalog 314. Choosing the server instance identification can include generating a session-unique value, selecting one value from a set of unique values, using an incrementing seed (seed++), etc. Choosing can be performed by an instance identification module.

In one embodiment of the disclosed technology the resolve procedure 400 continues to a clear new flag procedure 433 that removes the memory of the existence of a "new" reserved word token in the ordered set of tokens. Next, the resolve procedure 400 continues to the "update calling context from result" procedure 427 that operates as previously described.

The server instance identification (or equivalent) for the constructed the DRPC instance is returned to the DRPC client module 201 to be included within subsequent requests sent by the DRPC client module 201 to identify which DRPC instance is to be resolved on the DRPC server.

If at the "parse call chain" procedure 405, the request call chain contains a single token, the resolve procedure 400 simply flows through the iterate token procedure 406, the new modifier decision procedure 407, and the last token decision procedure 413; and uses the calling context from the get calling context procedure 403 when dispatching the request.

A server traverse chain module can include the functionality described with respect to the iterate token procedure 406 through the clear new flag procedure 433.

In JavaScript, a closure will capture the calling context. Furthermore, a token can be executed using the "eval( )" function within the calling context. Similar capability exists in a number of other prototypal languages (for example, the To programming language).

DRPC includes a morph process for modifying or defining (morphing) a property of a DRPC service entity while the DRPC server is executing. Thus, the morph process transforms the services provided by the DRPC server by removing a service, adding a service, or modifying a service. The morph process can be implemented by the morph module 315. The morph process is invoked responsive to a modification request. A modification request can include a property definition. The property identifier can identify a property of the DRPC service entity to be modified; and the property definition includes the definition/modification of that identified property. A property identifier can be included within the modification request, in the property definition (if provided), or both. A modification request that does not include a property definition is an inactivation request.

The server morph module can include a server inactivation module or can invoke operation of the server inactivation module if such is external to the server morph module.

Figure 5:
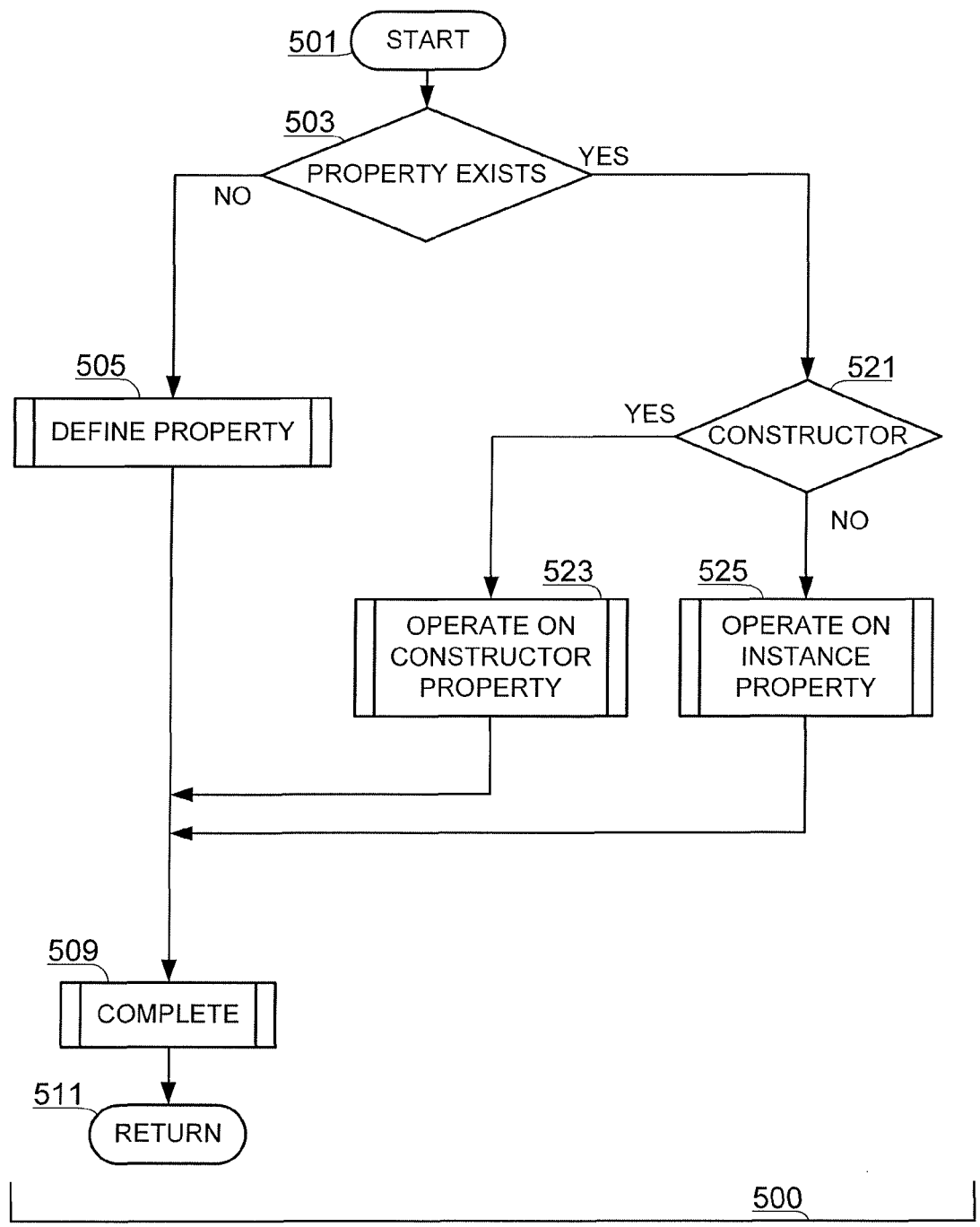
FIG. 5 illustrates a morph procedure in accordance with one embodiment.

FIG. 5 illustrates a morph procedure 500 in accordance with an embodiment of the disclosed technology. The morph procedure 500 is invoked from the "invoke morph" terminal 417 and is passed a token, a calling context and an instance flag (from arguments to the request) to be operated on by the morph procedure 500. The morph procedure 500 initiates through a start terminal 501, and continues to a property exists decision procedure 503 that determines whether the specified property exists within the DRPC service entity. If the property exists decision procedure 503 determines that the specified property does not exist, the morph procedure 500 continues to a define property procedure 505 that defines the property per the property definition within the modification request as described with reference to FIG. 6. Once the property is defined within the DRPC service entity, the morph procedure 500 continues to a complete procedure 509 that returns success or error status to the DRPC client via the status callback API 312 discussed with reference to FIG. 3. Finally, the morph procedure 500 returns through a return terminal 511.

If the property exists decision procedure 503 determines that the specified DRPC service entity contains the specified property, the morph procedure 500 continues to a "mutable instance constructor" decision procedure 521 to determine whether that property is within a mutable instance constructor or a DRPC instance. If the property is within a mutable instance constructor, the morph procedure 500 continues to an "operate on mutable instance constructor property" procedure 523 responsive to the instance flag.

The "operate on mutable instance constructor property" procedure 523 operates on a property of the mutable instance constructor in accordance with the modification request. If the modification request does not include a property definition, the request is an inactivation request (that is, this procedure will inactivate the property of the mutable instance constructor by using prototypal techniques (for example but without limitation, in JavaScript by using the "prototype" property)). Once the property is inactivated, the property is no longer available to any DRPC instance constructed by the mutable instance constructor.

If the request is a modification request that does include a property definition, this procedure modifies a property in accordance with the property definition by using prototypal techniques. Once the property is so modified, the modification is available to past and future DRPC instances constructed by that mutable instance constructor.

Next, the morph procedure 500 continues to the complete procedure 509 that returns success or error completion status as previously described and the morph procedure 500 completes through the return terminal 511

If the "mutable instance constructor" decision procedure 521 determines (responsive to the instance flag) that the property to be modified is within a DRPC instance instead of a mutable instance constructor, the morph procedure 500 continues to an "operate on instance property" procedure 525 that inactivates or modifies the property in accordance with the modification request but without using prototypal techniques. Thus, only that specific property within the DRPC instance is modified or inactivated. Next, the morph procedure 500 continues to the complete procedure 509 that returns success or error completion status as previously described and the morph procedure 500 completes through the return terminal 511.

There are many techniques to inactivate a property. Further, that child properties of the inactivated property also can be inactivated (for example, by explicit inactivation, operation of a memory garbage collector, etc.). Modification of a property also can be implemented by inactivating one property and replacing the inactivated property with a newly defined property that contains the modifications. While the previous discussion of the morph procedure 500 is focused on manipulation of DRPC service entities, the same concept can be applied to other objects within the prototypal environment (for example, define/modify/inactivate can be applied to any object or property within a JavaScript environment).

Figure 6:
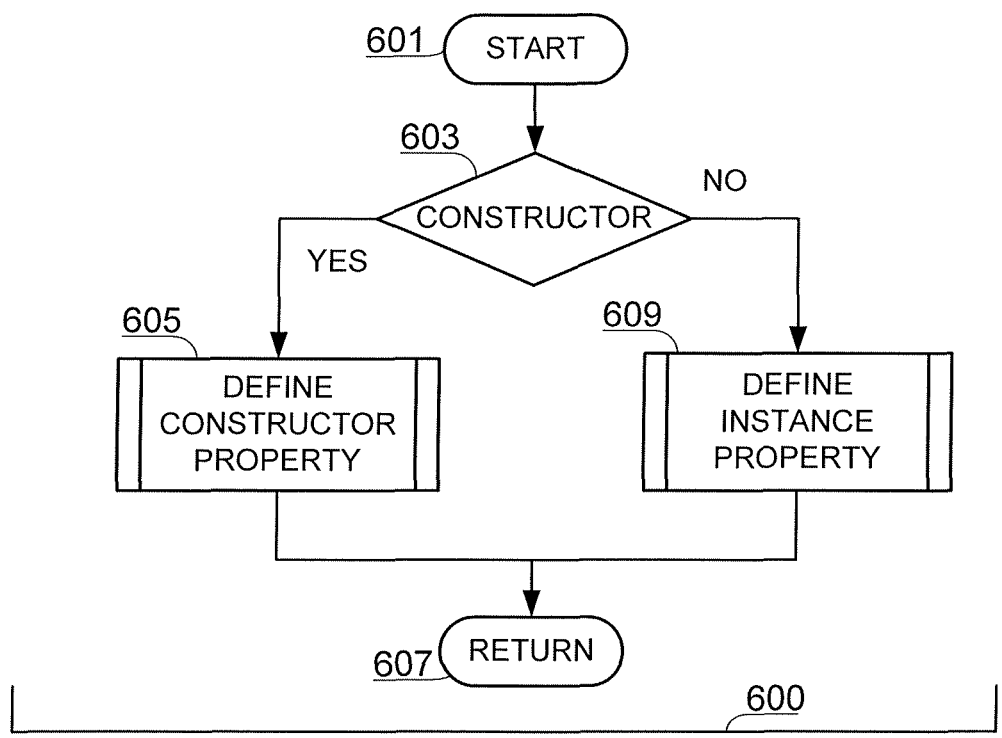
FIG. 6 illustrates a property definition procedure in accordance with one embodiment.

FIG. 6 illustrates a property definition process 600 that is invoked by the define property procedure 505 described with reference to FIG. 5, initiates at a start terminal 601 and continues to a constructor determination procedure 603. The constructor determination procedure 603 determines (responsive to the instance flag) whether the DRPC service entity is a mutable instance constructor or a DRPC instance. If the DRPC service entity is a mutable instance constructor, the property definition process 600 continues to a "define constructor property" procedure 605 that uses the property definition from the modification request to define the property within the mutable instance constructor using prototypal techniques (in JavaScript, by use of the "prototype" property). Thus, the property becomes available for all past and future instances constructed by the mutable instance constructor. The property definition process 600 returns to the morph procedure 500 via a return terminal 607.

If the constructor determination procedure 603 determines that the DRPC service entity is a DRPC instance, the property definition process 600 continues to a "define instance property" procedure 609 that uses the property definition from the modification request to define the property within the DRPC instance. The property definition process 600 returns to the morph procedure 500 via a return terminal 607.

Figure 7:
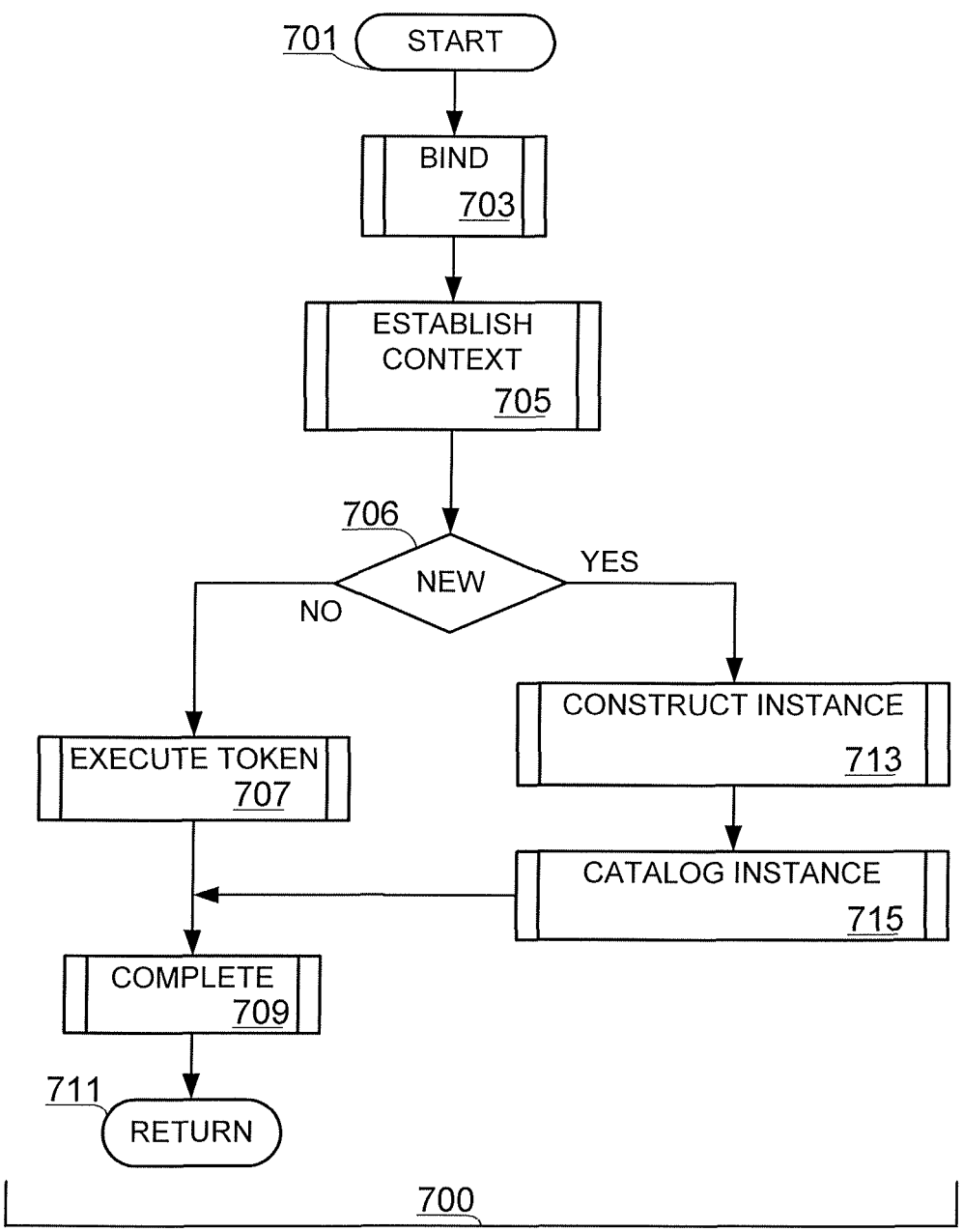
FIG. 7 illustrates an execute procedure in accordance with one embodiment.

FIG. 7 illustrates an execute procedure 700 that details one embodiment of the execute module 323. The execute process can be implemented by the execute module 323. The execute procedure 700 is invoked from the "invoke execute" terminal 419 described with reference to FIG. 4 through an entry terminal 701. The parameters passed include a token, its calling context, calling arguments, and whether the "new" reserved word preceded the token.

Note that the calling arguments can include client callbacks that will eventually execute at the client program 101.

On initiation through the entry terminal 701, the execute procedure 700 continues to a bind procedure 703. The bind procedure 703 evaluates the request's arguments. If a request argument is a client callback, it is substituted by a server callback. The purpose of this substitution is to enable 1) the server callback to be invoked from any DRPC server context while containing sufficient details to communicate client callback information to the DRPC client via the DRPC server callback API 325; and 2) the server callback to set client callback reference-type arguments with server instance identifications, as subsequently discussed. After the bind procedure 703 completes constructing server callbacks, the execute procedure 700 continues to an establish context procedure 705. The bind procedure 703 can be implemented as a server bind module that is incorporated within or invoked by a server execution module.

The establish context procedure 705 establishes the calling context for the token from the calling context parameter passed by the "invoke execute" terminal 419. The execute procedure 700 continues to a new decision procedure 706 that determines whether the "new" reserved word proceeded the token from the parameters passed by the "invoke execute" terminal 419. If not, the execute procedure 700 continues to an execute token procedure 707, which uses the calling context to execute the method represented by the token and pass its calling arguments (where client callbacks have been substituted by corresponding server callbacks by the bind procedure 703).

The invocation of the token (method) provides the service requested by the DRPC client and can immediately execute one or more of the bound server callbacks or cause the insertion of the server callbacks within any accessible global object or DRPC instance property for later invocation. The insertion can be accomplished for example but without limitation, by registering the server callback with an event listener, system timer, etc. These and other techniques can be used to insert a server callback.

The execute procedure 700 continues to a complete procedure 709 to prepare any desired success or error callback information to be delivered via the status callback API 312 or execute any bound server callback inserted by the execute token procedure 707, delivering results via the DRPC server callback API 325. Finally, the execute procedure 700 completes through a return terminal 711.

If the new decision procedure 706 determines that the "new" reserved word proceeded the token (responsive to the flag set by the set new flag procedure 411 and passed as a parameter), the execute procedure 700 continues to a "construct DRPC instance" procedure 713 that constructs an explicit DRPC instance by invoking the mutable instance constructor that corresponds to the token. Next, a "catalog DRPC instance" procedure 715 can assign a DRPC client-chosen server instance identification to the newly constructed DRPC instance. The "catalog DRPC instance" procedure 715 can catalog the DRPC client-chosen server instance identification per the DRPC client identifier in the request. The execute procedure 700 continues to the complete procedure 709 as previously discussed.

As previously described the bind procedure 703 substitutes the execution request's client callback arguments with server callbacks. Further, in one embodiment, there are two types of arguments to the client callbacks themselves: one type (value) is used to return data (for example, an integer, an array, a string, etc.). Another type (reference) is used to return a server instance identification (a reference to an instance).

For client callback value-type arguments, server callback value-type arguments are passed directly to the client callback. For client callback reference-type arguments, however, corresponding server callback arguments, which are of instance-type (that is, they are instances), cannot be passed directly to the DRPC client. In this case, a server instance identification (a reference-type) is chosen by the DRPC server, and is substituted for the server callback argument (an instance-type) before being passed to the client callback (as a reference-type). This process is described with reference to FIG. 9.

Figure 8:
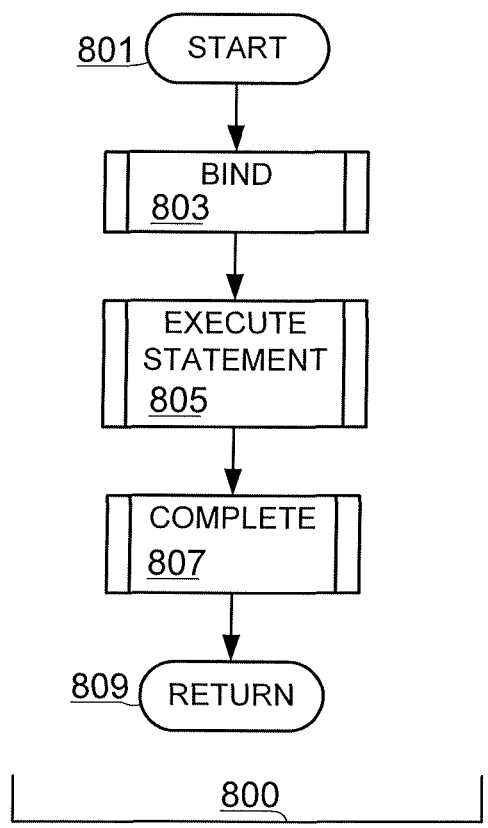
FIG. 8 illustrates an "execute ephemeral statement" procedure in accordance with one embodiment.

FIG. 8 illustrates an "execute ephemeral statement" procedure 800 that details one embodiment of the "execute ephemeral statement" module 321. The "execute ephemeral statement" process can be implemented by the "execute ephemeral statement" module 321. The "execute ephemeral statement" procedure 800 is invoked by the "invoke execute ephemeral" terminal 420 described with reference to FIG. 4 through an entry terminal 801. The "invoke execute ephemeral" terminal 420 provides an ephemeral statement that is to be executed by the "execute ephemeral statement" procedure 800 as well its calling context. In one embodiment, the provided calling context is a constant (the global context).

The "execute ephemeral statement" procedure 800 continues to a bind procedure 803 that is substantially similar to the bind procedure 703 described with reference to FIG. 7. Once any server callbacks are bound, the "execute ephemeral statement" procedure 800 continues to an execute statement procedure 805 that executes the ephemeral statement. Within the JavaScript prototypical language, for example, the execution of the ephemeral statement can be accomplished by using the "eval" function on the ephemeral statement.

For embodiments where the calling context for ephemeral statements may be other than the global context, the "execute ephemeral statement" procedure 800 would establish that calling context between the bind procedure 803 and the execute statement procedure 805 in a manner substantially similar to that described with respect to the establish context procedure 705.

The "execute ephemeral statement" procedure 800 continues to a complete procedure 807 to prepare any desired success/error callbacks to be delivered via the status callback API 312. The "execute ephemeral statement" procedure 800 completes through a return terminal 809.

The ephemeral request can use properties in one or more global objects or DRPC service entities. Some embodiments implement protection or security policies to restrict such use.

Figure 9:
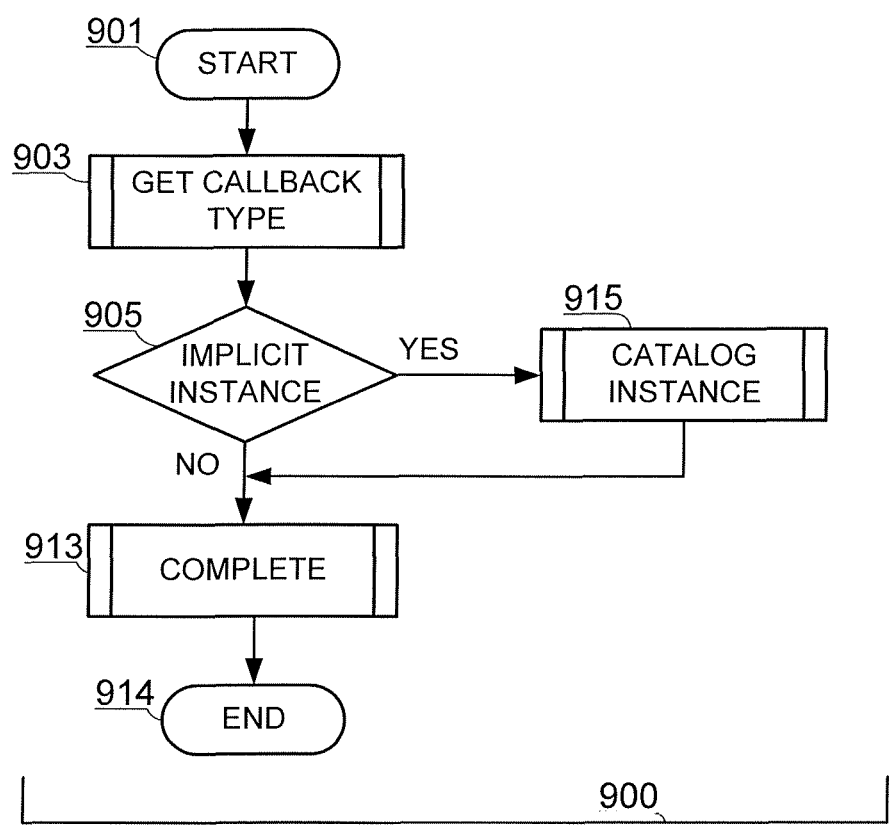
FIG. 9 illustrates a "DRPC server callback" procedure in accordance with one embodiment.

FIG. 9 illustrates the operation of a DRPC server callback procedure 900 when a server callback is invoked. Once invoked, the DRPC server callback procedure 900 initiates at a start terminal 901 and continues to get callback type procedure 903 that identifies the type of the server callback. Next, an implicit instance decision procedure 905 determines if the server callback argument is a value-type and if so, the DRPC server callback procedure 900 continues to a complete procedure 913 that assembles the DRPC client callback information and provides this information to the DRPC client via the DRPC server callback API 325.

If the implicit instance decision procedure 905 determines that the server callback argument is of instance-type (thus the implicit DRPC instance, which was constructed in fulfillment of the request, was passed in this argument to the server callback), the DRPC server callback procedure 900 continues to a catalog instance procedure 915 to choose and catalog a server instance identification for the implicit DRPC instance. The DRPC server callback procedure 900 then continues to a complete procedure 913 that assembles the DRPC client callback information. Assembly of the DRPC client callback information includes setting a client callback argument (that the client has defined as a reference-type argument) with the server instance identification (therefore including the server instance identification within the client callback). This DRPC client callback information is provided to the DRPC client via the DRPC server callback API 325.

The DRPC client can reside on the same computer as the DRPC server or on different computers and that communication between the DRPC client and the DRPC server is usually through a network API. Different virtual computers executing on the same physical computer is substantially equivalent to different physical computers. In addition, physical computers and memory are often embedded in, or fundamental to many common devices (such as smartphones, kitchen appliances, etc.). In addition, a modification request from the DRPC client transforms the DRPC server by modifying a DRPC service entity at the DRPC server while the DRPC server is operating, thus, transforming the services provided by the DRPC server.

The technology disclosed herein provides a Dynamic Remote Procedure Call technique that is much more flexible than traditional RPC techniques and provides aspects, benefits, and advantages as previously described. While many of the terms used in the specification are prefixed with "DRPC" to help distinguish between traditional RPC and DRPC concepts, a DRPC instance/object/function and so on is the same as any instance/object/function of a prototypal or object-oriented language.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer-implemented method for providing a dynamic remote procedure call (DRPC) capability between a client and a server, comprising the steps of:
    establishing a DRPC session between a client and a server while the client and the server are both active and communicating with the server executing an environment capable of self-modifying at run-time one or more DRPC service entities actively being run in the environment;
    sending a run-time property modification request by the client to the server, the run-time property modification request comprising both a DRPC service entity identification of a DRPC service entity actively being run in the environment on the server and a property definition of a property of the DRPC service entity to be modified;
    receiving the run-time property modification request by the server;
    resolving, by the server, the DRPC service entity as identified in the DRPC service entity identification from the one or more DRPC service entities actively being run in the environment on the server; and
    modifying, by the server, the resolved DRPC service entity based on the property in the property definition in the run-time property modification request through on-the-fly program modification.

2. The computer-implemented method of claim 1, further comprising the steps of:

sending, by the client, a subsequent request sent subsequent to the run-time property modification request, the subsequent request comprising the DRPC service entity identification;

receiving the subsequent request by the server; and resolving, by the server, the modified DRPC service entity as identified in the DRPC service entity identification from the one or more DRPC service entities actively being run in the environment on the server.

3. The computer-implemented method of claim 1, further comprising the steps of:

sending an inactivation request by the client to the server, the inactivation request comprising both a different DRPC service entity identification of a different DRPC service entity actively being run in the environment on the server and a property identifier of a property of the different DRPC service entity;

receiving the inactivation request by the server;

resolving, by the server, the different DRPC service entity as identified in the different DRPC service entity identification from the one or more DRPC service entities actively being run in the environment on the server; and inactivating the property of the different DRPC service entity as identified in the property identifier in the inactivation request.

4. The computer-implemented method of claim 1, further comprising the steps of:

sending an execution request by the client to the server, the execution request comprising both a different DRPC service entity identification of a different DRPC service entity actively being run in the environment on the server and a call token identifying a property of the different DRPC service entity;

receiving the execution request by the server;

resolving, by the server, the different DRPC service entity as identified in the different DRPC service entity identification from the one or more DRPC service entities actively being run in the environment on the server; and invoking the property of the different DRPC service entity identified by the call token.

5. The computer-implemented method of claim 1, further comprising the steps of:

sending an ephemeral request by the client, the ephemeral request comprising an ephemeral statement;

receiving the ephemeral request by the server; and executing the ephemeral statement by the server.

6. The computer-implemented method of claim 1, further comprising the steps of:

sending a different request by the client, the different request comprising at least one client callback procedure;

receiving the different request by the server; and binding, responsive to the receipt of the different request, the at least one client callback procedure to at least one server callback procedure.

7. The computer-implemented method of claim 6, the step of binding further comprising the steps of:

generating a first server callback procedure comprising an instance-type argument and one of the at least one client callback procedure as the at least one server callback procedure; and substituting the one of the at least one client callback procedure with the first server callback procedure within the different request.

8. The computer-implemented method of claim 7 further comprising the steps of:

executing the different request;

generating an implicit server instance responsive to the execution of the different request;

setting the instance-type argument to the implicit server instance;

invoking the first server callback procedure;

choosing a server instance identification for the implicit server instance passed via the instance-type argument;

cataloging the server instance identification; and returning the server instance identification within the one of the at least one client callback procedure to the client.

9. The computer-implemented method of claim 6, wherein the at least one client callback procedure includes a reoccurring callback.

10. The computer-implemented method of claim 1, further comprising the steps of:

sending a different request by the client, the different request comprising both the DRPC service entity identification and a call chain;

receiving the different request by the server; and resolving, by the server, the modified DRPC service entity as identified in the DRPC service entity identification from the one or more DRPC service entities actively being run in the environment on the server;

determining a calling context for the call chain;

parsing the call chain to generate an ordered set of one or more tokens comprising a last token; and determining a final calling context for the last token responsive to the calling context and the ordered set of one or more tokens.

11. The computer-implemented method of claim 10, wherein the ordered set of one or more tokens comprises a call token preceded by a new token, the method further comprising the step of constructing a server instance responsive to the call token.

12. A computer-implemented method for providing a dynamic remote procedure call capability on a server, comprising the steps of:

establishing a DRPC session on a server while the client and the server are both active and communicating with the server executing an environment capable of self-modifying at run-time one or more DRPC service entities actively being run in the environment;

receiving a run-time property modification request, the run-time property modification request comprising both a DRPC service entity identification of a DRPC service entity actively being run in the environment on the server;

resolving the DRPC service entity as identified in the DRPC service entity identification from the one or more DRPC service entities actively being run in the environment on the server; and modifying, by the server, the resolved DRPC service entity based on the property in the property definition in the run-time property modification request through on-the-fly program modification.

13. The computer-implemented method of claim 12, further comprising the steps of:

receiving a subsequent request received subsequent to receipt of the run-time property modification request, the subsequent request comprising the DRPC service entity identification; and resolving the modified DRPC service entity as identified in the DRPC service entity identification from the one or more DRPC service entities actively being run in the environment on the server.

14. The computer-implemented method of claim 12, further comprising the steps of:
   receiving an inactivation request comprising both a different DRPC service entity identification of a different DRPC service entity actively being run in the environment on the server and a property identifier of a property of the different DRPC service entity;
   resolving the different DRPC service entity as identified in the different DRPC service entity identification from the one or more DRPC service entities actively being run in the environment on the server; and
   inactivating the property of the different DRPC service entity as identified in the property identifier in the inactivation request.

15. The computer-implemented method of claim 12, further comprising the steps of:
   receiving an execution request comprising both a different DRPC service entity identification of a different DRPC service entity actively being run in the environment on the server and a call token identifying a property of the different DRPC service entity;
   resolving the different DRPC service entity as identified in the different DRPC service entity identification from the one or more DRPC service entities actively being run in the environment on the server; and
   invoking the property of the different DRPC service entity identified by the call token.

16. The computer-implemented method of claim 12, further comprising the steps of:
   receiving an ephemeral request comprising an ephemeral statement; and
   executing the ephemeral statement.

17. The computer-implemented method of claim 12, further comprising the steps of:
   receiving a different request comprising at least one client callback procedure; and
   binding the at least one client callback procedure to at least one server callback procedure.

18. The computer-implemented method of claim 17, the step of binding further comprising the steps of:
   generating a first server callback procedure comprising an instance-type argument and one of the at least one client callback procedure as the at least one server callback procedure; and
   substituting the one of the at least one client callback procedure with the first server callback procedure within the different request.

19. The computer-implemented method of claim 18 further comprising the steps of:
   executing the different request;
   generating an implicit server instance in accordance with the execution of the different request;
   setting the instance-type argument to the implicit server instance;
   invoking the first server callback procedure;
   choosing a server instance identification for the implicit server instance passed via the instance-type argument;
   cataloging the server instance identification; and
   setting the server instance identification within the one of the at least one client callback procedure.

20. The computer-implemented method of claim 17, wherein the at least one client callback procedure includes a reoccurring callback.

21. The computer-implemented method of claim 12, further comprising the steps of:
   receiving a different request, the different request comprising both the DRPC service entity identification and a call chain;
   resolving the modified DRPC service entity as identified in the DRPC service entity identification from the one or more DRPC service entities actively being run in the environment on the server;
   determining a calling context for the call chain;
   parsing the call chain to generate an ordered set of one or more tokens comprising a last token; and
   determining a final calling context for the last token in accordance with the calling context and the ordered set of one or more tokens.

22. The computer-implemented method of claim 21, wherein the ordered set of one or more tokens comprises a call token preceded by a new token, the method further comprising the step of constructing a server instance in accordance with the call token.

23. A system for providing a dynamic remote procedure call capability between a client and a server, comprising:
   a non-transitory computer readable storage medium comprising program code; and
   a computer processor and memory on a server with the computer processor coupled to the storage medium, wherein the computer processor is configured to execute the program code to perform steps to:
      self-modify at run-time one or more DRPC service entities actively being run in an execution environment, comprising:
         establish a DRPC session within the execution environment while a client and the server are both active and communicating;
         receive a plurality of requests, the plurality of requests including a run-time property modification request comprising both a DR PC service entity identification of a DRPC service entity actively being run in the environment on the server and a property definition of a property of the DRPC service entity be modified;
         resolve the DRPC service entity as identified in the DRPC service entity identification from the one or more DRPC service entities actively being run in the environment on the server; and
         modify the DRPC service entity based on the property definition in the modification request through on-the-fly program modification.

24. The system of claim 23, wherein the plurality of requests includes a subsequent request received subsequent to receipt of the run-time property modification request, the subsequent request comprising the DRPC service entity identification that resolves to the modified DRPC service as identified in the DRPC service entity identification from the one or more DRPC service entities actively being run in the environment on the server.

25. The system of claim 23, wherein the plurality of requests further comprises an inactivation request comprising both a different DRPC service entity identification of a different DRPC service entity actively being run in the environment on the server and a property identifier of a property of the different DRPC service entity and wherein the different DRPC service entity identification resolves to the different DRPC service entity as identified in the DRPC service entity identification from the one or more DRPC service entities actively being run in the environment on the server, and the computer processor is further configured to execute the program code to perform steps to:

inactivate the property of the different DRPC service entity as identified in the property identifier in the inactivation request.

26. The system of claim 23, wherein the plurality of requests further comprises an execution request comprising both a different DRPC service entity identification of a different DRPC service entity actively being run in the environment on the server and a call token identifying a property of the different DRPC service entity, and wherein the different DRPC service entity identification resolves to a different DRPC service entity as identified in the DRPC service entity identification from the one or more DRPC service entities actively being run in the environment on the server, and the computer processor is further configured to execute the program code to perform steps to:
  invoke a property of the different DRPC service entity identified by the call token.

27. The system of claim 23, wherein the plurality of requests further comprises an ephemeral request comprising an ephemeral statement, and the computer processor is further configured to execute the program code to perform steps to:
  execute the ephemeral statement.

28. The system of claim 23, wherein the plurality of requests further comprises a different request comprising at least one client callback procedure, and the computer processor is further configured to execute the program code to perform steps to:
  bind the at least one client callback procedure to at least one server callback procedure.

29. The system of claim 28, wherein the computer processor is further configured to execute the program code to perform steps to:
  generate a first server callback procedure comprising an instance-type argument and one of the at least one client callback procedure, and further configured to substitute the one of the at least one client callback procedure with the first server callback procedure within the different request, and execute the different request.

30. The system of claim 29, wherein the computer processor is further configured to execute the program code to perform steps to:
  generate an implicit server instance and set the instance-type argument to the implicit server instance;
  invoke the first server callback procedure;
  choose a server instance identification for the implicit server instance passed via the instance-type argument;
  catalog the server instance identification; and
  set the server instance identification within the one of the at least one client callback procedure.

31. The system of claim 28, wherein the at least one client callback procedure includes a reoccurring callback.

32. The system of claim 23, the plurality of requests further comprising a different request comprising a call chain, and wherein the computer processor is further configured to perform steps to:
  determine a calling context for the call chain and to parse the call chain to generate an ordered set of one or more tokens comprising a last token; and
  traverse the ordered set of one or more tokens and determine a final calling context for the last token responsive to the calling context.

33. The system of claim 32, wherein the ordered set of one or more tokens comprises a call token preceded by a new token, wherein the computer processor is further configured to execute the program code to perform steps to:
  construct a server instance responsive to the call token.

* * * * *